Figure 4:
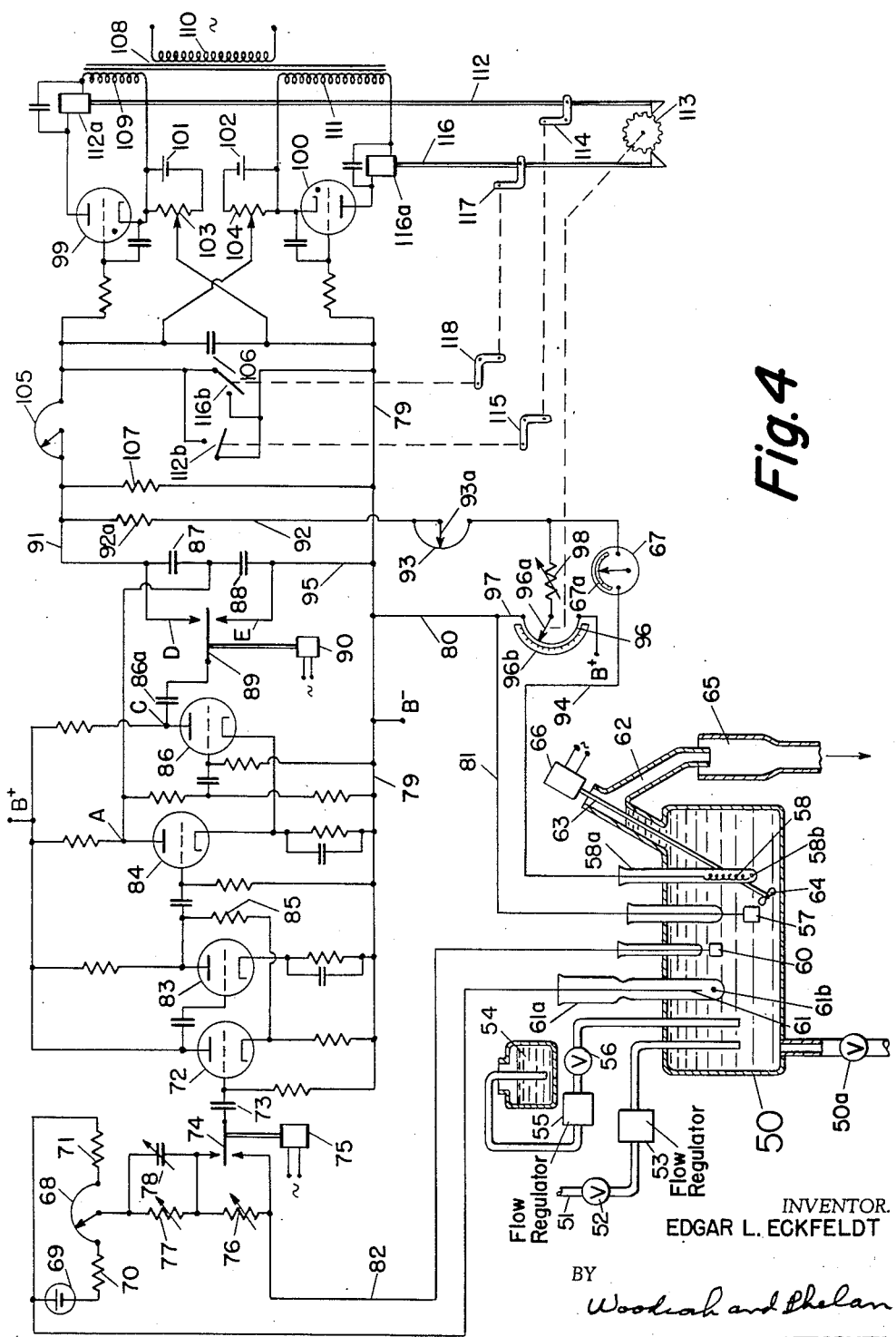

Aug. 7, 1956
E. L. ECKFELDT
2,758,079
ELECTROLYTIC DETERMINATION OF THE CONCENTRATION
OF A CONSTITUENT IN A FLUID
Filed March 29, 1950
3 Sheets-Sheet 1
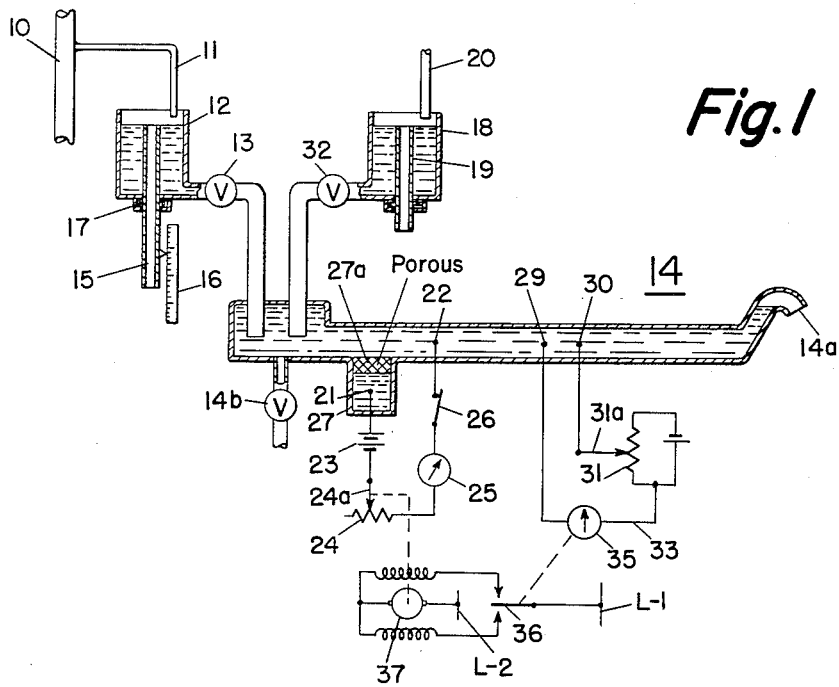
Fig.1
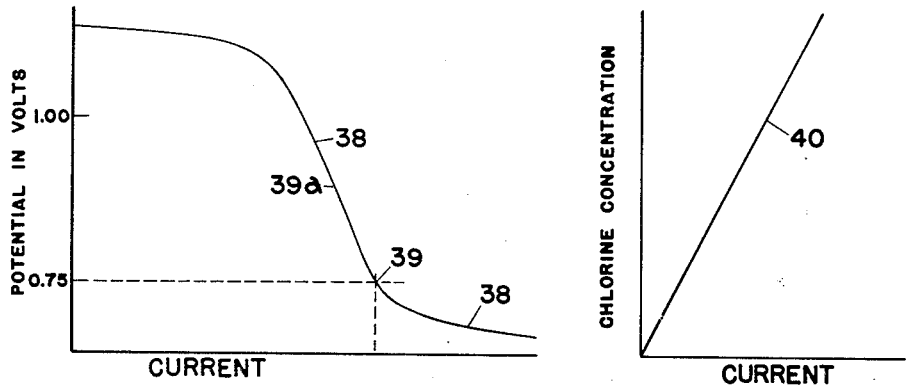
Fig.2
Fig.3
INVENTOR.
EDGAR L. ECKFELDT
BY
Woodcock and Phelan
ATTORNEYS.

INVENTOR.
EDGAR L. ECKFELDT
BY
Woolrah and Phelan
ATTORNEYS.

United States Patent Office 2,758,079
Patented Aug. 7, 1956

2,758,079

ELECTROLYTIC DETERMINATION OF THE CONCENTRATION OF A CONSTITUENT IN A FLUID

Edgar L. Eckfeldt, Ambler, Pa., assignor to Leeds and Northrup Company, Philadelphia, Pa., a corporation of Pennsylvania Application March 29, 1950, Serial No. 152,734

7 Claims. (Cl. 204—195)

This invention has for an object the provision of a system for determining in an electrolyte the concentration of a constituent of a fluid, which constituent may be a substance in either a liquid or in a gas, and has for a further object the provision of a method of determination of a halogen such as chlorine concentration; and a further object of providing an improved control system by means of which the titrating current in a continuous system is at all times indicative of the concentration of the constituent in the electrolyte.

The present application is a continuation-in-part of my earlier filed application Serial No. 564,536, filed November 21, 1944, now Patent No. 2,621,671. In that application there are set forth numerous examples of determinations of concentrations of constituents in solutions by passage of an electric current through solution electrolytically to change the compositional characteristic of the solution to bring a constituent therein to an end point for determination of its concentration.

Though generally applicable to electrotitration of materials, certain features of the present invention have been claimed in a divisional application, Serial No. 572,763, filed March 20, 1956, said features being particularly applicable to the determination of the concentration of chlorine in water. Chlorine is widely used in industry for bleaching, frequently in high concentration, and there is widespread use of chlorine as a bactericide. The present invention meets a need of measuring with accuracy and speed the concentration of chlorine in solution, as in water. It is well known that the free available chlorine released in water combines with other substances, such as ammonia or certain organic compounds. While some of the resultant products may be effective as oxidizing agents, they are less effective than the free available chlorine which may be defined as either in the form of chlorine, hypochlorous acid, or hypochlorite ion. Further in accordance with the present invention, the concentration of free chlorine may be determined to the exclusion of the "combined available chlorine" which may be defined as including products or compounds formed by the union of the free available chlorine with other substances, such as ammonia.

The ease in determining the chlorine concentration may be readily appreciated by the following equation and by the conditions of measurement which may, in accordance with one form of the invention, comprise the passage of the water and chlorine at constant rate through an electro-analyzing cell in which current flows between two electrodes at a rate which converts the free chlorine to maintain the solution passing through the chamber or cell at an end point. The concentration of chlorine may be expressed by the following equation:

$$C = 0.3674 \frac{I}{R} \quad (1)$$

in which

C is the concentration of the chlorine in milligrams per liter,

I is the current in milliamperes,

R is the flow-rate of a sample in milliliters per second, and 0.3674 is the quotient of the equivalent weight of chlorine (35.46) divided by one faraday (96,500) and multiplied by 1,000 for the current to be given in milliamperes.

More particularly, the foregoing equation applies where the solution in the treating chamber is maintained srongly acidic, as with sulphuric acid, and in which there is an adequate supply of a suitable agent, more particularly, ferric sulphate. The electrolyzing current reduces the ferric ion to the ferrous ion with subsequent reaction of the ferrous ion with chlorine. One faraday of current will reduce one equivalent of ferric iron at an inert electrode such as platinum. It will be seen that the ferrous ion is returned to the ferric state by reaction with the chlorine, and hence, undergoes no net change. Accordingly, it may be thought of as an electrocatalytic agent in the reduction of the chlorine.

An oxidation-reduction electrode of platinum detects the condition of equivalence and deviations from it. It has been found to be a very sensitive indicator under the foregoing conditions of use and provides significant changes in potential for a very slight excess of either the chlorine or of the ferrous ion.

The determination of the concentration of chlorine in the foregoing manner comprises a further feature of the present invention. The invention is also applicable to batch operations where a known quantity of a solution is placed in the cell and the chlorine brought to an end point, the coulombs of electricity required being indicative of the concentration of the chlorine.

In accordance with features of the invention to which the claims of the present application are directed, there is provided an automatically operable control system for controlling the current in the treating zone through which the liquid passes at a predetermined rate. The control system is characterized by the provision of an amplifier whose direct current output is not only utilized as a component of the electrolyzing current, but which is also applied to the control of a current regulator for control of the flow of the electrolyzing current between the electrodes. The foregoing system preferably includes the provision of proportional action, rate action, and reset action with independent adjustment of each component control action. Thus, the system has adequate flexibility to adapt it to a variety of processes where the concentration of a constituent in a solution may at all times be indicated by a suitable indicating instrument, as by a recording ammeter.

Figure 5:
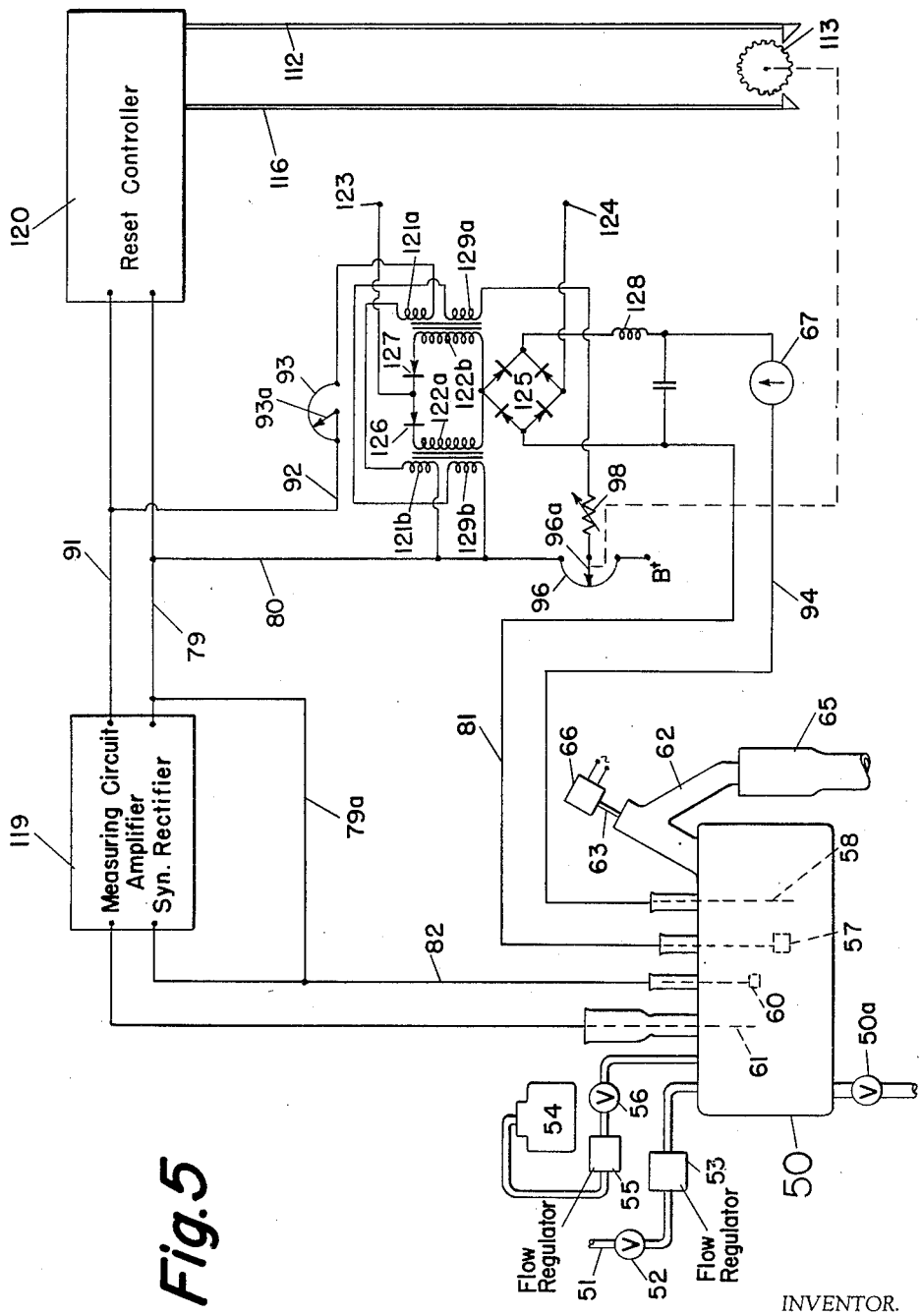

For further objects and advantages of the invention and for further novel aspects thereof, reference is to be had to the following description taken in conjunction with the accompanying drawings, in which:

Fig. 1 diagrammatically illustrates a continuous sampling system, which may also be used for batch operation, embodying the invention;

Figs. 2 and 3 are graphs useful in explaining the theoretical and practical basis of operation of one application of the invention;

Fig. 4 diagrammatically illustrates a modification including an amplifier having features forming a part of the present invention; and Fig. 5 illustrates a modified control system including a magnetic amplifier embodying the invention.

Referring to Fig. 1 the invention in one form has been illustrated as applied to the determination of the concentration of a constituent of a liquid flowing through a pipe 10. By means well understood by those skilled in the art, a sample may be continuously drawn from the pipe 10 by means of a smaller pipe 11 which directs the slip-sample into a constant-bead receptacle 12 for maintaining constant at any desired rate the flow of liquid by way of normally-open valve 13 into the closed treating zone or chamber 14. By raising or lowering the overflow pipe 15 of the device 12, the head upon the liquid flowing into the flow channel or zone 14 by way of valve 13 may be changed as desired, a scale 16 being provided to predetermine the flow-rate. Suitable packing as at 17 is provided to prevent leakage around pipe 15. A similar vessel 18 with an adjustable overflow pipe 19 is provided to receive a reagent or auxiliary liquid furnished through supply pipe 20 from any suitable source.

Disposed within the closed treating zone or flow channel 14 are means for producing electrolysis comprising electrodes 21 and 22 supplied from current from a suitable source of direct-current supply as indicated by the battery 23. The magnitude of the current is under the control of a variable resistor 24, an ammeter or other indicating device 25 being included in the series-circuit. A switch 26 is shown for opening and closing the circuit. It is to be observed reaction products formed at the electrode 21, immersed in an electrically conductive solution, are isolated from the solution in flow channel 14 by the closed end of chamber 27 formed by a porous diaphragm 27a which may be of parchment paper or unglazed ceramic material. Thus, while current flows through the permeable material, the electrolytic reaction at electrode 21 within vessel or chamber 27 is isolated from the electrolytic reaction at the other electrode 22.

The potential between detecting electrodes 29 and 30 within channel 14 is opposed by an adjustable source of voltage, i. e., by a potential developed between contact 31a of resistor 31 and conductor 33 of a potentiometer including a suitable source of supply shown as a battery. By relatively adjusting contact 31a and resistor 31 to develop a potential corresponding with an end point of the liquid in flow channel 14, any departure from that value as detected by potential electrodes 29 and 30 will produce deflection of a galvanometer 35, diagrammatically shown as operating a single-pole double-throw switch 36 to energize a motor 37 for rotation in one direction or the other relatively to adjust contact 24a of resistor 24, to vary the electrolyzing current to bring the potential between electrodes 29 and 30 to a value equal to that appearing between contact 31a and conductor 33. In practice the galvanometer 35 may be a component part of a mechanical relay such as disclosed in Squibb Patent No. 1,935,732.

When the rate of flow through the reaction zone formed by the flow channel 14 of a liquid of unvarying composition is constant, the normality (N) of the solution with respect to the constituent being measured is set forth by the following equation:

$$N = \frac{I}{96,500R} \quad (2)$$

where

I is in amperes, and
R equals the rate of flow of solution in liters per second.

The foregoing equation sets forth the inter-relationship between the normality of the solution, the current and the rate of flow of the solution. The conversion of normality (N) to other expressions of concentration, and the calculation from the normality, of the weight of a substance in a particular volume of liquid or for a known rate of flow thereof are well known to those skilled in the art and need not here be further set forth.

In my aforesaid co-pending application a number of illustrative applications of the invention were disclosed, including the determination of the concentration of hydrochloric acid in an aqueous solution. For that determination, the anode 21 is preferably of silver, and the cathode 22 preferably of platinum. The electrolytic action releases hydrogen at the cathode 22, thus reducing the acidity. The chemical reaction at the anode 21 is isolated from flow channel 14 and is inconsequential to the eletcrotitration measurement being conducted.

By adjusting the rapidity with which hydrogen is formed, as by controlling the magnitude of the current flowing between electrodes 21 and 22, the liquid passing the potentiometric electrodes 29 and 30 may be maintained at an end point. Thus, the ammeter 25 may be calibrated in terms of hydrochloric acid concentration. Where pH values are used to indicate an end point, one of the electrodes 29 and 30 may be a glass electrode, a hydrogen electrode or an antimony electrode, and the other electrode a reference electrode such as calomel electrode with a potassium chloride bridge.

Where the hydrochloric acid solution contains electrically conductive materials such as sodium nitrate, it is not necessary to add a reagent by way of pipe 20 and, hence, the valve 32 may be closed. When the conductivity is low it will be desirable to add a suitable neutral and conductive solution by way of pipe 20, as a solution of sodium nitrate which will increase the conductivity without affecting the electrochemical reactions.

For batch operations the flow channel 14 may be filled until there is discharge of liquid from its outlet 14a and then valve 13 closed. If the ammeter 25 then be a coulometer or other type of instrument for measuring the total current flow, the switch 26 may be closed and the electrolysis continued until galvanometer 35 indicates the arrival of the solution at an end point. Thereupon the switch 26 will be opened, and the concentration of the constituent will be known in terms of the total current flow required to bring the hydrochloric acid to an end point. For a second batch operation, the flow channel 14 can then be drained through drain valve 14b, and a new sample introduced.

For the determination of the concentration of free available chlorine in water, a sample of such water flowing through the pipe 10 may be introduced into the constant-head device 12 for flow at a predetermined rate through the flow channel or treating zone 14. In accordance with the present invention the water sample is treated with from about one-twentieth to about one-thirtieth of its volume by an auxiliary solution supplied through pipe 20 and comprising about 20 per cent ferric sulphate, 20 per cent sulphuric acid, the remainder water. While it is to be understood that the composition and the amount of auxiliary solution used is not critical, nevertheless the use of such a solution for determination of concentration of chlorine forms a part of the present invention. In accordance with the invention, it is necessary strongly to acidify the solution in the treating zone 14. It is believed there is a resulting increase in the concentration of elementary chlorine by changing the chlorine equilibrium. However, by increasing the acidity, there is produced a greater tendency for the solution to lose chlorine by evaporation. Therefore, the flow chamber 14 is preferably closed to prevent such loss. For chlorine determination, the cathode 22 is formed of platinum, while the anode 21 may be of any suitable material, also of platinum, if desired. The solution in chamber 27 may be a 20 per cent solution of sulphuric acid.

The ferric component added with the auxiliary solution is an electro-catalytic agent in the reduction of the chlorine. More particularly, the electrolysis converts ferric ion to ferrous ion, which in reacting with the chlorine produces chloride ion and ferric ion. The foregoing may be expressed by the following equations:

$$\bar{e} + Fe^{+++} \rightarrow Fe^{++} \quad (3)$$

$$Fe^{++} + \tfrac{1}{2}Cl_2 \rightarrow Fe^{+++} + Cl^- \quad (4)$$

Now, adding Equations Nos. 3 and 4, there is obtained, $$\bar{e} + Fe^{+++} + Fe^{++} + \tfrac{1}{2}Cl_2 \rightarrow Fe^{++} + Fe^{+++} + Cl^- \quad (5)$$

The net reaction is, therefore, $$\bar{e} + \tfrac{1}{2} Cl_2 \rightarrow Cl^- \qquad (6)$$

where $\bar{e}$ = one faraday, 96,500 coulombs.

The foregoing equations set forth explicitly the pertinent chemical reactions involved and will be adequate for those skilled in the art to understand the mechanisms involved. In the disclosure and in the claims the reference to ferric ions means the ions corresponding with $Fe^{+++}$ and the ferrous ions correspond with $Fe^{++}$. Reference has also been made to chloride, $Cl^-$, which exists as a negative ion in the solution and, hence, is referred to as such, as is customary in the chemical field.

Further in accordance with the invention it has been found that if the titrating current be plotted as abscissae against the voltage setting of the potentiometer slidewire 31, as ordinates, a graph such as the curve of 38 of Fig. 2 will be obtained, the conditions being a constant flow through zone 14 of water including chlorine of constant concentration of 0.5 milligrams per liter and of the auxiliary solution comprising acidified ferric sulphate.

With zero flow of electrolyzing current between electrodes 21 and 22, i. e., with switch 26 open, there will be a potential between detecting electrodes 29 and 30 which, as indicated by the intersection of curve 38 with the vertical axis of origin, is relatively high. For the graph of Fig. 2, the detecting electrode 29 is of platinum, and the detecting electrode 30 is a saturated calomel electrode. It will be understood that the maximum potential between electrodes 29 and 30 is readily determined by moving contact 31a relative to resistor 31 until the galvanometer 35 remains in its undeflected position, as at zero.

If the switch 26 now be closed and the contact 31a moved toward conductor 33 to decrease the potential, the galvanometer 35 will deflect in a direction to energize the motor 37 to adjust the current flow between electrodes 21 and 22 to reduce the potential between electrodes 29 and 30 to equal that established by the adjustment of contact 31a.

The electrolyzing current as indicated by Equations Nos. 3–6 converts some of the free available chlorine to chloride ions. There is a corresponding reduction in potential between electrodes 29 and 30. The curve 38 illustrates the fact that as contact 31a is moved gradually to reduce the potential from the maximum balancing value with zero electrolyzing current, more and more electrolyzing current is required to reduce the potential between electrodes 29 and 30 by corresponding amounts. The decrease of potential for equal increments of current is initially fairly gradual, corresponding with a gradual removal of chlorine from the solution. There is then a region where the potential change is great with small changes in current. In that region a relatively wide change in the setting of contact 31a produces only a small change of current. It has been found that the potential-current point 39 represents an end point for the chlorine. In the region of point 39 all of the chlorine has been converted to chloride. A further decrease in the voltage setting by contact 31a beyond the region of point 39 requires an increasing electrolyzing current correspondingly to reduce the potential between electrodes 29 and 30, the further reduction in that potential being due to an excess of ferrous ions in the solution.

Since the region of the point 39 represents not only an end point, but a potential end point of sharpness analogous to conventional potentiometric end points of conventional titration systems, the newly discovered potential end point for chlorine affords a basis for rapid and accurate determination of the concentration of free available chlorine in solution.

It is to be noted that the graph 38 is typical for a constant value of chlorine concentration in the uniform flow of the sample through the flow channel or treating zone 14. If the chlorine concentration should increase and remain constant at a new value, a similar curve would be obtained, but it would be displaced to the right of curve 38. However, the region of the end point 39 would occur at the same voltage produced or appearing between detecting electrodes 29 and 30, namely, about 0.75 volt. The required electrolyzing current would be greater. Conversely, with a lesser concentration of chlorine, a curve similar to 38 would be obtained, but it would be displaced to the left of curve 38, the region of the end point again being for a voltage or potential difference of 0.75 volt.

The graph of Fig. 3 summarizes the foregoing phenomena in that the curve 40 plotted against current as abscissae and chlorine concentration as ordinates is a straight line illustrating the linearity and direct relationship between the electrolyzing current and the chlorine concentration at the potentiometric end point of 0.75 volt. The curve 40 is a graphical representation of Equations Nos. 1 and 2, above set forth.

One of the advantages of the present invention is the exceedingly high precision with which the concentration of chlorine may be determined. If the potential between contact 31a and conductor 33 be set at 0.75 volt, plus or minus 5 millivolts, the maximum change in indication of chlorine concentration is less than plus or minus 5 parts per billion. It will be recalled that curve 38 of Fig. 2 was obtained under conditions including a constant flow through zone 14 of water including chlorine. Thus, curve 38 represents dynamic equilibrium conditions of the reacting constituents. Inasmuch as there is involved in the reactions which take place a certain element of time, it has been found desirable to select the end point 39 fairly well down on the curve, as shown in Fig. 2, and at the point 0.75 volt. This value is likewise suitable for batch determinations. Where batch determination is utilized, a curve similar to curve 38 of Fig. 2 may be obtained.

Further in accordance with the invention, it is to be understood that the selection of the potential end point 0.75 volt is preferred for optimum operation. This end point is in terms of the potential developed between the particular detecting electrodes used. For a different reference electrode a different end point potential would be developed which would only require suitable adjustment of the contact of slidewire 31 to oppose it with an equal potential. If it is desired to operate the system with an arbitrarily selected point of more than 0.75 volt, as for example a point in the region above 0.75, about midway of the linear part of the curve, as at 39a, the system would function satisfactorily, but it would be necessary to apply a correction of constant value since the chlorine would not then be entirely removed from the solution. Since the amount remaining would be constant for the point 39a, a constant correction would be applied.

The added solution from vessel 18, including ferric sulphate, has been found to be particularly advantageous as the electro-catalytic agent not only because of its efficacy in the chemical reaction, but also because of its low cost. However, it is important that there not be present in the auxiliary solution impurities of an oxidizing or reducing character with respect to the chlorine, since such impurities in small amounts materially change horizontally the position of curve 38, and hence, would introduce error into the determination of the concentration of the chlorine in the solution due to the resultant change in current caused by the impurities.

It has been found that ferric sulphate available on the market though of reagent grade, the highest grade available, contains enough impurities to introduce undesirable effects into the determination of the chlorine concentration. These impurities include ferrous iron and materials capable of undergoing slow oxidation or reduction under the conditions existing in the cell 14. The ferrous impurity is of less consequence than the sluggishly oxidizable and reducible impurities, since a solution containing only ferrous iron as an impurity can be appropriately oxidzed to remove all traces of the ferrous iron, or the measurement can be made to include compensation for the ferrous impurity. Such compensation may be accomplished in the continuous method by appropriately off-setting the zero of the current-measuring device 25, or in the batch method, by adding to the result the amount equivalent to the ferrous iron introduced with the auxiliary solution. As a matter of fact, such compensation has been found very expedient in practice to correct the readings for reducing or oxidizing impurities which react readily.

The deleterious presence of those other impurities which do not react readily manifests itself by causing the system as a whole to respond sluggishly, by imparting to the auxiliary solution, over periods of time, instability of its performance characteristics, and by rendering ineffective a simple compensation as described above. Thus, in the continuous method the error introduced by these other impurities is not the same at low values of chlorine as it is at high values of chlorine, but is some complicated function of the particular chlorine concentration.

Such impurities have been found to be absent from readily available ferrous sulphate of U. S. P. or reagent grade. Hence, by utilizing ferrous sulphate and oxidizing the same to ferric sulphate, there is obtained an electro-catalytic agent for use in accordance with the present invention. More particularly, sulphuric acid and ferrous sulphate are dissolved in water. There is then added potassium permanganate of reagent grade, which oxidizes the ferrous sulphate to ferric sulphate. A final solution of 20% sulphuric acid ($H_2SO_4$) and 20% ferric sulphate ($Fe_2(SO_4)_3$) has been found quite satisfactory. The progress of the oxidizing reaction can be followed by measuring the oxidation-reduction potential with a platinum electrode and a saturated calomel reference electrode. At room temperature, 25° C., the potential of a properly oxidized solution is 0.75 volt.

While other oxidation agents for the ferrous sulphate may be used, such as hydrogen peroxide, potassium permanganate is preferred.

Reference is now made to Equations Nos. 3–6 where it will be observed that the important function of the auxiliary solution is to supply the ferric ions to the flow channel or treating zone 14. Accordingly, it is to be understood that the ferric ions may be supplied to the electrolyzing zone by other solutions such, for example, as ferric chloride, or ferric nitrate, though the ferric sulphate is preferred by reason of the superior performance of the system as a whole.

While the contol system of Fig. 1 has operated in practice in the manner described, something was left to be desired in an improved control of the electrolyzing current more uniformly to maintain the solution passing through the flow channel 14 at an end point and to prevent hunting or oscillation of the electrolyzing current about the needed value to maintain the constituent in the solution at the end point. Further in accordance with the present invention, the system of Fig. 4 has been found of considerable advantage in controlling the electrolyzing current so that its value at all times is representative of the concentration being measured without significant error due to oscillation of the electrolyzing current about its concentration-indicating value.

Referring to Fig. 4, a cell 50 forming the treating zone has been utilized in place of the flow channel 14 of Fig. 1. The cell 50 may be utilized either for continuous determination of the concentration of a constituent in the solution or for batch determination thereof. Fig. 4 will be described by using the particular example of chlorine determination, but it is to be understood that the electrical circuit is suitable for other chemical determinations and/or for other control and measurement applications. For continuous operation a drain valve 50a will be closed, and the fluid containing the free available chlorine to be measured will be introduced by way of a supply line 51 under the control of a valve 52 and a flow regulator 53. The flow regulator may either be of the constant-head type, as shown in Fig. 1, or it may comprise a constant-volume delivering device such as a displacement pump driven at predetermined constant speed and with predetermined stroke. As exemplary, a flow rate of about six milliliters per minute may be selected for the particular system herein described. If the material introduced into the pipe 51 be a liquid containing chlorine, the concentration of which is to be determined, the auxiliary solution can be siphoned from a suitable source of supply, such as a carboy 54, and under the control of a flow regulator 55 introduced through open valve 56 into the treating chamber 50. The auxiliary solution will be prepared, as has already been explained, and the flow regulator 55 will be adjusted to maintain in the treating chamber 50 a pH of between about 0.3 and 1.8 and a concentration of ferric iron of about 0.04% to 5% by weight. The region of operability is not sharply defined, and performance falls off gradually in the marginal parts beyond the foregoing limits. For practical reasons it is desirable to operate close to the more dilute limits of these ranges since less auxiliary solution is thereby used. It has been found a pH of 1.3 and a ferric iron concentration of 0.2% constitute very satisfactory operating conditions.

While the flow rate of the auxiliary solution 54 need not be critically controlled, the control regulator 55, which may be of any suitable type such as the constant-head type, is utilized to conserve the amount of auxiliary fluid used and to add auxiliary fluid at the rate of about one-twentieth to one-thirtieth that of the flow rate of the fluid through pipe 51.

The titrating electrode 57 may be a platinum wire, or as shown may comprise a platinum plate of the order of 6 millimeters by 22 millimeters. The area of this electrolyzing electrode, the cathode, is not critical so long as it presents sufficient area for the particular conditions under which it is used. The size given has been found satisfactory for concentrations of chlorine not in excess of 10 milligrams per liter. For lower concentrations, the area can be less and, of course, the larger area is suitable for the lower concentrations. The other titrating electrode 58 may comprise a 1 cm. square platinum plate, platinized, or as shown it may comprise a spiral platinized platinum wire supported in a separate chamber 58a of glass provided with a dual glass junction or capillary opening 58b which provides conductive connection between the electrolyte in cell 50 and the electrolyte in chamber 58a. Chamber 58a is filled with a suitable conductive solution, such as 20% sulphuric acid. Such a dual junction is of relatively low resistance, of the order of 2,000 ohms.

One of the potentiometric or detecting electrodes comprises a platinum-iridium plate 60 which may have an area of the order of about one square centimeter, and the other comprises a conventional reference electrode which includes a saturated calomel electrode 61 contained in the glass container 61a which is provided with a liquid junction 61b, like that of 58b.

It will be observed that the solution with the unknown constituent and the auxiliary solution are discharged into chamber 50 through the inlet pipes having openings near the bottom of that chamber, and that a discharge channel 62 is provided near the upper end of chamber 50. The chamber or treating cell 50 is completely filled with the liquid which flows upwardly around a shaft 63 having a stirrer 64 at its lower end and is discharged as waste through a pipe 65. A motor 66 drives the rod 63 and stirrer 64 to insure rapid and intimate mixture of the entering solutions with the solution in the cell and to maintain as nearly as possible homogeneous conditions throughout the volume of the cell 50. Such a stirring arrangement may also be utilized in the flow channel 14 of Fig. 1.

For batch operations, the valve 50a can be opened to drain the cell 50 after each successive determination of the concentration of the constituent in the solution introduced into the cell.

It is to be observed that during normal operation the valve 50a is closed, and the only opening to the cell 50 is in the narrow upwardly extending channel in which the rod 63 is disposed. This flow channel is small enough and long enough to assure effective isolation of the liquid subject to electrolysis in avoidance of any effect thereon of loss of gaseous constituents or of effects due to the atmosphere. The discharge is located downstream along the outlet from chamber 50. Where the constituent to be determined is itself a gas, it is to be understood it will be introduced under pressure, as by way of pipe 51, and will pass into a suitable electrolyte introduced by way of valve 56 for continuous or batch determination of concentrations thereof.

With the cell 50 operating in the manner described, the concentration of the constituent, such as chlorine, can be read directly on a scale 67a of a measuring instrument 67 shown in the form of an ammeter. The reading of the ammeter 67 at all times is a measure of the current flowing between the titrating electrodes 57 and 58 which, it will be recalled, will bear a linear relation with respect to the concentration of the chlorine in solution when of a value to maintain the potential between electrodes 60 and 61 equal to the 0.75 volt introduced by a slidewire or variable resistor 68. The system as a whole in functioning to maintain equality between the potential appearing between electrodes 60 and 61 and that from an adjustable source of voltage of magnitude determined by the setting of slidewire 68 maintains the reading of the ammeter 67 in terms of chlorine concentration. The potential introduced by slidewire 68 is a fractional part of the voltage from a standard cell 69 connected in series circuit with slidewire 68 through resistors 70 and 71. The resistance of the circuit in series with cell 69 is relatively high, of the order of 1.5 megohms. If the potential developed by the detecting means, i. e., between electrodes 60 and 61 varies from the potential set by slidewire resistor 68, a signal voltage is applied to the first stage of an amplifier shown as a triode 72. By employing the standard cell 69 in the relatively high resistance circuit, it is feasible to set and to maintain the end point at 0.75 volt within plus or minus 5 millivolts, thus assuring the determination of the chlorine concentration within the previously indicated limits of plus or minus 5 parts per billion.

There is included in the input or grid circuit of the triode 72 a grid capacitor 73 which serves as a direct-current isolating capacitor between the circuits of the potential electrodes and the circuits of the electrolyzing electrodes. The input circuit also includes a vibrator or a converter 74 driven by a coil 75 from a suitable source of alternating current supply alternately to connect the capacitor 73 to the upper and lower stationary contacts of the vibrator. It is to be observed these contacts are connected directly across the variable resistor 76. Consequently, the voltage or potential difference appearing across resistor 76 will correspond with the signal voltages applied to the input circuit of triode 72.

Also included in the input circuit are a variable resistor 77 and a variable capacitor 78. The capacitor 78 in conjunction with resistor 76 forms a differentiating circuit for introducing rate action into the control system, the magnitude of which may be varied by adjusting the capacity of capacitor 78 and/or resistor 76 or resistor 77. In one embodiment of the invention a capacitor 78 of 24 microfarads with a 3.3 megohm resistor 76 was found satisfactory, the resistor 77 being of the order of 5 megohms.

It is to be observed that the input circuit to the triode 72 is completed by way of conductors 79, 80, 81, titrating electrode 57, solution within cell 50, detecting electrode 60, and by way of conductor 82 to the lower contact of vibrator 74. In this manner the input circuit to the amplifier input circuit is isolated from the effects of the direct current derived from the output circuit for electrodes 57 and 58 in manner hereinafter to be explained.

The remaining stages of the amplifier shown as including triodes 83 and 84 may be conventional in character and circuit components of the amplifier as a whole not identified by reference characters need not be described in detail. A feedback resistor 85 provided at the output circuit of tube 83 introduces into the input circuit of tube 72 a fractional part of the output signal.

The three stages 72, 83 and 84 provide relatively high gain for the amplifier. A phase-inverting stage including the triode 86 functions in conjunction with the last stage 84 further to increase the voltage output of the amplifier in conjunction with a circuit including capacitors 86a, 87 and 88. The capacitor 86a may be 0.5 microfarad, and capacitors 87 and 88, 0.05 microfarad, though other capacities may be used, it being desirable to have capacitor 86a large compared with capacitors 87 and 88. A vibrator or synchronous rectifier 89, driven by a coil 90 from the same or separate source of supply having the same frequency as that for coil 75, serves alternately to connect the output of tube 86 to capacitors 87 and 88. Since the tube 86 is a phase inverter, it will be understood that the triode 84 drives triode 86 one hundred and eighty degrees out of phase. Accordingly, the output voltage appearing at the anode of tube 84 is one hundred and eighty degrees out of phase with the output voltage appearing at the anode of tube 86. Hence, there appears between the points A and C about twice the voltage which appears at the anode of either triode alone. Thus, when the vibrator contact engages the upper stationary contact, this doubled voltage is applied to capacitor 87, and when the vibrator contact engages its lower stationary contact, this doubled voltage is applied to capacitor 88.

Since the vibrator 89 functions as a synchronous rectifier, the polarity of the voltage applied to capacitor 87 will be one hundred and eighty degrees out of phase with the voltage applied to capacitor 88. Hence, the voltages applied to these capacitors will be additive in the series-circuit in which they are included, and there will be a voltage amplification of about four times the voltage appearing at either of the anodes of the tubes 84 or 86. In the series-circuit the voltage is, of course, unidirectional, since that series-circuit forms the output circuit of the synchronous rectifier. The polarity of the voltage applied to the output circuit 91—79 will depend upon the direction or polarity of input signal appearing across input resistor 76.

The magnified unidirectional output voltage is applied directly to electrodes 57 and 58 for flow of electrolyzing current through a circuit which may be traced from output conductor 91 by way of resistor 92a, conductor 92, resistor 93, ammeter 67, conductor 94, electrodes 58 and 57, and by way of conductors 81, 80 and 95 to the other side of the synchronous rectifier. Accordingly, with the system thus far described, it will be seen that ammeter 67 will read directly the current output from the synchronous rectifier and that its magnitude will be dependent of the amplitude of the input signal within the limitations of the current output of the final stages of the amplifier.

If the output circuit of the amplifier be relied upon as the sole source of electrolyzing current, it will, of course, be understood that for increase in output current an increase in input signal will be required, even though the amplifier has a high gain. It is desirable to utilize a high-gain amplifier in conjunction with a control system which will maintain the electrolyzing current at any desired value with an input signal or an error voltage due to unbalance of the measuring circuit which is small. This is conveniently accomplished by providing a separate source of supply for all, or a component of, the electrolyzing current. As shown, that current source may comprise the source of anode voltage for the amplifier, one supply terminal of which is indicated at B+ and which includes a rheostat 96 connected by conductor 97 to the other supply line 79 to which the other supply terminal B— is connected. Of course, the source of titrating current may be separate and apart from that of the amplifier, though in either case it should be of constant voltage, as from a closely regulated power-pack.

By the provision of the dual source of electrolyzing current and by other features of the circuit, desirable control actions are provided. The direct-current output of the amplifier which produces flow of electrolyzing current by way of conductors 92 and 80 between electrodes 57 and 58 is made up of two components, one due to proportional action and the other due to rate action. The magnitude of the component of rate action has already been described as under the control of the variable circuit components 76—78. The magniude of the proportional action, due to the magnitude of the error voltage, is under the control of, or can be adjusted by, changing the relative values of resistors 76 and 77. The magnitude of the combined components due to the proportional action and the rate action may be adjusted by varying the setting of contact 93a relative to resistor 93.

A third component of control, reset action, is provided by the adjustment of the contact 96a with respect to resistor 96. This adjustment determines the voltage and magnitude of the current component flowing between electrodes 57 and 58 from the separate source of supply. The resistor 96 is variable and preferably has a high maximum resistance value, of the order of 0.2 megohm with respect to the resistance of rheostat 96, of the order of 5,000 ohms, and is provided so that the position of contact 96a relative to resistor 96 will have little effect upon the amplifier output current from the synchronous rectifier. Thus, the setting can be such that there will be a predetermined flow of electrolyzing current from the separate source, of the order of 0 to 5 milliamperes. Resistor 98 may be adjusted to change the range of the magnitude of the reset current. The amplifier and synchronous rectifier are capable of varying the electrolyzing current above and below this level by as much as 1 milliampere, depending upon the sign and magnitude of the voltage applied to the input circuit of the amplifier at stage 72. The resistor 92a has a value of .33 megohm and insures adequate resistance in the amplifier output circuit when slidewire 93 is set to a minimum value. The foregoing numerical examples are to be taken as illustrative since other values may be used, and the separate source selected for supply of any desired magnitude of electrolyzing current.

The manner in which reset action is introduced into the control system will now be described. The operation is such that upon application of an input signal to the amplifier, contact 96a will be moved to a position so that the flow of current from the auxiliary source B+ will maintain the constituent at the end point with substantially zero flow of output current from the synchronous rectifier except, of course, at the time of change in the input signal.

The manner in which the reset action is obtained constitutes a further feature of the present invention and includes a pair of electric valves, shown as grid-controlled rectifiers, such as thyratrons 99 and 100 whose input or grid circuits are normally negatively biased by biasing circuits including batteries 101 and 102 and adjustable resistors 103 and 104. Hard tubes with sharp cut-off may also be used. The output signals from the amplifier and synchronous converter are applied through a variable resistor 105 which is preferably of high resistance, of the order of 10 meghoms maximum, to a capacitor 106 which may be of the order of 20 microfarads. Resistor 107 of about 2 megohms is provided to complete a direct-current return path.

If it be assumed the output signal causes a charging current to flow through resistor 105 and into capacitor 106, returning by way of conductor 79, it will be seen at once that the grid of the tube 99 will be made less negative with respect to its cathode, while the grid of the tube 100 will be made more negative with respect to its cathode. When the charge on capacitor 106 raises the grid voltage of tube 99 above its critical value, the thyratron 99 will fire, and an impulse of current will flow from secondary winding 109 of transformer 108, having a primary winding 110 and another secondary winding 111, through the operating coil 112a of a stepping relay 112. The relay 112 thereupon operates to rotate a toothed wheel 113 in a counterclockwise direction. Simultaneously the relay 112 closes its contacts 112b to discharge the capacitor 106, suitable operating means therefor being shown in the drawing as comprising crank arms 114 and 115.

The appearance of an output signal of polarity which makes the conductor 91 positive with respect to conductor 79 corresponds with a rise in the potential between electrodes 60 and 61 above that set at the slidewire 68. Hence, the operation of relay 112 is in a direction to rotate the contact 96a in a counterclockwise direction to increase the electrolyzing current again to bring the potential between electrodes 60 and 61 equal to that set by slidewire 68. If the single step-adjustment of the toothed wheel 113 does not immediately reestablish equality of balance in the measuring network, the thyratron 99 will fire again, and will continue to fire until balance is reestablished. In this connection, it is to be observed that the firing rate of thyratron 99, and accordingly, the rate of reset action, will depend upon the amplitude of the input signal and upon the time constant of the charging circuit of capacitor 106. That time constant may be adjusted by means of the variable resistor 105. Thus the component of current due to the reset action has a magnitude which varies as a function of both the magnitude of the signal voltage applied to the input of the amplifier and the duration of that signal voltage. So long as there is an input signal voltage, the Thyratron 99 will continue to fire at a rate determined by the magnitude of the signal voltage and the setting of the aforesaid time constant. The result is a cycling of relay 112 at a rate proportional to the magnitude of the signal voltage. The Thyratron 100 is similarly controlled when the signal voltage reverses the polarity for the cycling of the relay 116.

More particularly, when the direction of the unbalance current reverses, both in the measuring circuit including the vibrator 74 and in the output circuit of the synchronous rectifier, the charge on capacitor 106 will be reversed. Accordingly, the grid of the thyratron 100 will be made less negative as capacitor 106 is charged, while the grid of thyratron 99 will be made more negative with respect to its cathode. Thus, the thyratron 100 will fire at a rate dependent upon the magnitude of the output signal and the time constant of the charging circuit of capacitor 106.

With each pulse delivered from thyratron 100 by secondary winding 111 through the operating coil 116a of relay 116, the wheel 113 will be rotated in a clockwise direction to rotate the contact 96a in a clockwise direction to reduce the electrolyzing current between electrodes 57 and 58. Each time relay 116 is energized, it operates its contacts 116b to discharge capacitor 106, operating means therefor being illustrated as crank arms 117 and 118.

The stepping relays 112 and 116 have been found to be highly satisfactory for control of the electrolyzing current. They are rugged in design, reliable in operation, and of lower cost than a reversible electric motor which could be used in place thereof and within the scope of the appended claims. However, by utilizing a helically wound resistor 96 and a toothed wheel, some 800 steps are utilized to rotate the contact 96a from one limiting position to the other. Thus, the change in electrolyzing current per step is of such small order as to enable rapid and satisfactory balancing of the measuring network.

With the system functioning as described, it will be understood that the output current of the amplifier closely approximates zero with a uniform rate of flow of solution of constant concentration through the cell 50. Under stabilized conditions of control, the setting of the contact 96a with respect to slidewire 96 will determine the magnitude of the current flowing between electrodes 57 and 58. Hence, the position of contact 96a with respect to slidewire 96 can be taken as a measure of the concentration of the constituent or chlorine in the solution in cell 50. A scale 96b can be provided, calibrated in terms of concentration of chlorine. Such a scale 96b may be in place of or supplementary to the scale 67a on the chart of the ammeter 67. If desired, the movement of contact 96a may be utilized to drive a pen relative to a chart, and thus there may be combined with slidewire 96 and its contact 96a the other elements of a recording instrument.

Reference has already been made to the fact that the output current of the converter-rectifier may itself be utilized for the determination of the concentration of chlorine in water. The system of Fig. 4 is in general preferred and is applicable to many industrial applications. Where the concentration of chlorine is relatively high, of the order of 1% by weight, there will then be required an electrolyzing current of the order of several amperes, and the electrode 58b may then be arranged in a separate container in manner described for electrode 21 of Fig. 1. The electrodes 57 and 58 would be correspondingly increased in size and porous diaphragm 27a of adequate conductivity.

For applications for the measurement of higher concentrations of chlorine or other substances where high electrolyzing currents are desired, the system of Fig. 5 may be utilized. Corresponding parts have been given like reference characters, and the measuring circuit, amplifier, and synchronous rectifier have been diagrammatically illustrated by the block 119 of the diagram. There has been added the connection provided by conductor 79a from conductor 79 to conductor 82 to complete the cathode connection of the input circuit to the first stage of amplifier 119. This connection is needed since the magnetic amplifier isolates detecting electrode 60 from conductor 79 in contrast with the arrangement of Fig. 4. Similarly, the control circuit including the thyratrons 99 and 100 have been designated by the block 120 which may be referred to as the reset control.

In the present disclosure, "proportional action" is referred to as a change in current flow related to the change in magnitude of the error voltage which, of course, is due to the degree with which the concentration of the constituent differs from that value corresponding with an end point. Mathematically, where $\theta$ is the deviation of the concentration of the constituent from an end point, the proportional action may be expressed as $$k_1 \theta$$

where $k_1$ is a constant.

When the electrolyzing current is changed in accordance with change in the rate of deviation, the control effect is known as "rate action." As earlier stated, it is produced by means of the differentiating circuit including capacitor 78 and resistor 76. Mathematically, the rate action may be expressed as $$k_2 \frac{d\theta}{dt}$$

Whenever the concentration of the constituent is at a value other than the end point, an error signal is produced which produces energization of the ratchet mechanism 113 for adjustment of the rheostat. The longer the constituent is away from the end point the greater will be the adjustment produced by the mechanism 113. Mathematically, reset action produces a regulating effect related to the time integral of deviation of the constituent from the end point; i. e., the control action:

$$k_3 \int \theta dt$$

The three effects may be expressed mathematically:

$$-V = k_1\theta + k_2\frac{d\theta}{dt} + k_3\int \theta dt$$

where, of course, $-V$ is the compensating effect.

In the system of Fig. 5 the output signal from the synchronous rectifier appearing between conductors 79 and 91 is applied by way of resistor 93 to control windings 121a and 121b of a magnetic amplifier having power windings 122a and 122b connected to alternating-current supply lines 123 and 124 by way of the full-wave rectifier 125, half-wave rectifiers 126 and 127 being included in the series-loop circuit including the power windings. Flow of current through the control windings 121a and 121b varies the output current from the magnetic amplifier flowing by way of a choke coil 128, measuring instrument or ammeter 67, by way of conductor 94 to the anode electrode, and returning by way of conductor 81 to the other side of the full-wave rectifier 125.

An increase in the current flowing through control windings 121a and 121b increases the electrolyzing current, and a decrease in the control current decreases the electrolyzing current. This arrangement has the advantage over the system of Fig. 4 in that better advantage is taken of the output current from the amplifier and synchronous rectifier in controlling the electrolyzing current, since there is avoided loss due to the inclusion of resistors 93 and 98 in the output circuit.

The system of Fig. 5 has the further advantage that the reset circuit including the reset resistor 96 also serves to control flow of current through control windings 129a and 129b, which also vary the magnitude of the electrolyzing current. The relays 112 and 116 are utilized in the same manner as described in Fig. 4 to adjust the toothed wheel 113 and the contact 96a of resistor 96 to vary the current flowing through the control windings 129a and 129b. Thus, the electrolyzing current from the magnetic amplifier consists of two components, one dependent upon the magnitude of the output current from the amplifier and synchronous converter 119, and the other of which depends upon the setting of contact 96a with respect to reset resistor 96. Any desired number of stages for the magnetic amplifier may be provided for control of larger values of direct current. A current capacity of up to about 10 amperes will ordinarily suffice for maximum current requirements. It is to be understood that the construction of the magnetic amplifier may be of more or less conventional design except for the manner in which it is employed in the present system, a discussion of the structural features thereof being well known to those skilled in the art. For further details, reference may be had to the article appearing in "Electronics," September 1948, at pages 88–93, and to Fitzgerald Patents Nos. 2,027,311 and 2,464,639.

In both of the embodiments of the invention as illustrated in Figs. 4 and 5, the provision for adjustment of proportional action, rate action, and of reset action makes possible the variation of the several components of the control action to meet the needs of each application of the invention. There is also provided adjustment of the time constant of the input circuit of the thyratrons 99 and 100 which provides control of the rate of operation of relays 112 and 116 for a given change.

In practice it will generally be desirable to provide a recording type of ammeter 67 which may change an instrument of the type disclosed in Case Patent No. 1,455,074. As well understood by those skilled in the art, the nature of the record on the chart will indicate the nature of the adjustments to be made in properly proportioning the components of rate, reset, and proportional action needed to maintain the electrolyzing current between electrodes 57 and 58 at the proper value to maintain the end-point potential between detecting electrodes 60 and 61. Where the system is utilized first to determine concentration of one order and then to determine the concentration of a substantially different order, relative adjustments in the control actions will likely be necessary to assure the maintenance of the electrolyzing current without oscillation and other undesirable excursions from the control point.

It has already been emphasized that certain features of the control system of Figs. 4 and 5 are for general application and are not limited to the control of electrolyzing current. It is also to be understood that for ease in fully understanding the advantages of the control systems of Figs. 4 and 5, only one example of the determination of the concentration of a substance in solution has thus far been discussed in connection with those systems. However, the discovery of the electrocatalytic property of the ferric ion has application to substances other than chlorine. For example, a solution containing potassium permanganate may be introduced into the reaction zone of vessel 50 in manner above described for chlorine. The end point of 0.75 volt is the same for the permanganate ($MnO_4^-$) as for the chlorine. The outer operations will be as described, and the concentration of the permanganate in the solution may be read directly from the meter 67 or from scale 96b during stabilized operation of the control system. The electrolysis changes the permanganate ion to the manganous ion with change of the iron undergoing the change from ferric to ferrous and returning to ferric, as in the case of the chlorine described above. In general, the ferric ion can be utilized as an electro-catalytic agent for substances which have oxidation-reduction potentials materially above those of a ferric-ferrous system, providing that substance has the capability of quantitative reaction, at least in part, with the ferrous ion. Such other substances may include a ceric component of a soluble substance, such as ceric sulphate. The electrolysis, with the electro-catalytic agent effective as before, converts the ceric ion to the cerous ion.

Other electrochemical catalytic agents may be selected from oxidation-reduction tables and comprise those systems where positive metallic ions are in the electrolysis, at least in part reversibly converted to positive metallic ions of lower valence to transform or chemically to bring to an end point the constituent in the solution whose concentration is to be determined. Such other electrochemical catalytic agents include systems comprising in order of increasing potentials such as the following:

Chromic ions ($Cr^{+++}$)—Chromous ($Cr^{++}$)
Titanic ions ($Ti^{++++}$)—Titanous ($Ti^{+++}$)
Stannic ions ($Sn^{++++}$)—Stannous ($Sn^{++}$)
Cupric ions ($Cu^{++}$)—Cuprous ($Cu^+$)
Mercuric ions ($Hg^{++}$)—Mercurous ($Hg_2^{++}$)
Thallic ions ($Tl^{+++}$)—Thallous ($Tl^+$)

The stannous-stannic system may be selected for iodine and bromine. The end-point potential for each such system will be determined in the manner set forth in connection with Figs. 2 and 3 for the ferrous-ferric system.

In its broader aspects there is provided in accordance with the present invention a method of determining the concentration of a substance in a solution having a given oxidation-reduction potential characterized by passage of electrolyzing current through the solution or electrolyte containing said constituent with said electrolyte containing metallic ions having a lesser oxidation-reduction potential than that of the substance in solution, the substance and the reduced metallic ions having the capacity of quantitative reaction at least in part with each other. The valance of the metallic ions is lowered by the electrolysis and the electrolyzing current employed is measured to indicate the concentration of the substance in the electrolyte.

In the foregoing examples reference has been made to the instrument 67 as an ammeter and as a coulometer, the instrument in each case being calibrated directly in terms of the concentration of the constituent to be measured. In the above cases the current efficiency will be 100%. It is to be understood the invention is not limited to those cases where there is 100% current efficiency, since it is also applicable to the determination of constituents which are apparently converted at less than or greater than 100% current efficiency, the only requirement being an empirical calibration of the scale of the measuring instrument to take care of the efficiencies above or below 100%. An example in the former category is ozone where the apparent conversion is greater than 100% and for which the scale will be empirically calibrated. The end point for ozone with the saturated calomel reference electrode may be set the same as for chlorine, namely at 0.75 volt.

In the foregoing description and in the claims reference is made to potentiometric means for determining the end point. This term is defined as including any means for producing a potential difference which varies with concentration of the constituent in the electrolyte and may include circuits including light-responsive devices, such as photoelectric cells, responsive to color changes of the solution, which produce in the input circuit of the amplifier a potential difference which changes in the region of the end point to provide indication that the concentration of the constituent in the electrolyte has been brought to a predetermined concentration. Further in connection with the potentiometric detecting means, it will be recalled that the capacitor 73 of Fig. 4 was described as isolating the input circuit of the amplifier from effects of the electrolyzing current and to the input circuit arrangement which includes a path through the electrolyte. The circuit independence as between the input circuit of the amplifier and the circuit for the electrolyzing current is attained in Fig. 5 by the transformers of the magnetic amplifier which serve to isolate the output circuit of the amplifier from the source of electrolyzing current including alternating current supply terminals 123 and 124 and the rectifier 125.

While batch operations have been referred to in connection with Figs. 1, 4 and 5, it is to be understood that the control system needed for a batch operation need not include all of the features of Figs. 4 and 5, but on the contrary may be simplified as shown in Fig. 1. However, both of the control systems of Figs. 4 and 5 may be utilized for batch operations without circuit change thereof, in which case each control system will function as above described after the cell 50 has been filled with a solution plus the auxiliary liquid to control the flow of electrolyzing current to bring the constituent in the cell to an end point. The meter 67 in such case would then be a coulometer of any suitable type of which there are a number known to those skilled in the art. Since either the system of Fig. 4 or the system of Fig. 5 will function to bring the concentration of the constituent in the electrolyte to an end point, it will be unnecessary to provide a manually operable switch to interrupt the flow of electrolyzing current. The advantage of the automatic system is that when the end point is reached, the electrolyzing current has been reduced to zero, and the current-integrating meter 67, such as the coulometer, will then indicate directly the concentration of the constituent in the electrolyte in terms of the total electricity used in bringing it to the known concentration.

While preferred modifications of the invention have been described in detail, it is to be understood the invention is not limited thereto, since many modifications may be made within the scope of the appended claims.

What is claimed is:

1. In a system for continuously determining the concentration of a constituent in a fluid, the combination of a vessel containing electrolyte forming a treating zone for passage of said fluid therethrough, a flow-controller for varying the rate of flow of said fluid through said zone, means including a pair of current electrodes disposed for flow of direct current therebetween electrolytically to vary the concentration of said constituent in said zone during its passage through said zone, potential electrodes disposed in said electrolyte, a measuring circuit connected to said potential electrodes and including means for producing a potential opposing that appearing between said potential electrodes, amplifying means having an input circuit responsive to unbalance between said potentials for developing a flow of output current, a source of current, a circuit including a current-regulator for flow of electrolyzing current through said current electrodes from said source, a second circuit for flow of said output current from said amplifier to said current electrodes, adjusting means for said current-regulator operable in accordance with the output from said amplifier to bring said concentration of said constituent to a predetermined value, and means in circuit with said electrodes for measuring the total flow of electrolyzing current.

2. In a system for continuously determining the concentration of a constituent in a fluid, the combination of a cell for passage of fluid therethrough, a flow-controller for regulating the rate of flow of said fluid through said cell, means including a pair of electrodes disposed in an electrolyte containing said fluid for flow of current between said electrodes electrolytically to vary the concentration of said constituent in said cell, potentiometric means responsive to the concentration of said constituent in said cell, an amplifier having an input circuit connected to said potentiometric means and an output circuit, connections between said output circuit and said electrodes for flow of output current between said electrodes, and current-regulating means adjustable in accordance with the magnitude and direction of said output current for regulating flow of direct current between said electrodes from a source other than said output circuit, said combined currents varying the concentration of said constituent in said cell to bring it to a predetermined value.

3. In a system for continuously determining the concentration of a constituent in a fluid, the combination of a cell for passage of fluid therethrough, electrodes disposed in said cell in an electrolyte containing said fluid for flow of current between said electrodes electrolytically to vary the concentration of said constituent in said cell, potentiometric means responsive to the concentration of said constituent in said cell, control means including an amplifier having an input circuit connected to said potentiometric means and an output circuit for controlling the flow of said current between said electrodes, said control means including a current regulator having a current source separate from the output of said amplifier for said electrolyzing current operable in response to the output from said amplifier to adjust said electrolyzing current to a value to maintain the concentration of said constituent in said fluid at an end point with substantially zero output from said amplifier, and means operable with change in current flow due to said current regulator for indicating the concentration of said constituent in said fluid.

4. In a system for continuously determining the concentration of a constituent in a fluid, the combination of a cell for passage of fluid into and out of it, electrodes disposed in said cell in an electrolyte containing said fluid for flow of electrolyzing current between said electrodes electrolytically to vary the concentration of the constituent in said cell, detecting means responsive to the concentration of said constituent in said cell for producing a potential difference, adjustable means including a source of voltage for developing a predetermined potential difference corresponding with a selected end point of said constituent in said electrolyte, a circuit in which said detecting means and said adjustable means are connected in voltage opposition for producing a signal voltage of magnitude and polarity corresponding with the extent and direction of deviation of said constituent from said selected end point, control means including an amplifier having an output circuit and an input circuit responsive to said signal voltage, said control means including a current regulator having separate from the output of said amplifier a current source for said electrolyzing current, said current regulator including a pair of current-adjusting devices selectively operable in response to the output of said amplifier, one of said devices when said signal voltage is of one polarity changing said electrolyzing current to vary said concentration in a direction to return said constituent to said selected end point, and the other of said devices when said signal voltage is of opposite polarity changing said electrolyzing current to vary said concentration in a direction to return said constituent to said selected end point, and means including said amplifier and said current regulator for establishing at least one component of said electrolyzing current of magnitude proportional to the magnitude of said signal voltage and a second component of magnitude which varies directly as a function of both the magnitude of said signal voltage and the duration of said signal voltage, said second component determining the level of current flow which maintains said constituent at said end point when said signal voltage and said first-named component are reduced to zero.

5. The system of claim 4 in which said current regulator comprises a magnetic amplifier having power windings and having control windings energized from the output circuit of said amplifier in accordance with said selective operation of said current-adjusting devices, and in which separate from said output of said amplifier said power windings, a rectifier and a source of alternating current supply comprise said current source for said electrolyzing current.

6. In a system for continuously determining the concentration of a constituent in a fluid, the combination of a cell for passage for fluid into and out of it, electrodes disposed in said cell in an electrolyte containing said fluid for flow of electrolyzing current between said electrodes electrolytically to vary the concentration of the constituent in said cell, detecting means responsive to the concentration of said constituent in said cell for producing a potential difference, adjustable means including a source of voltage for developing a predetermined potential difference corresponding with a selected end point of said constituent in said electrolyte, a circuit in which said detecting means and said adjustable means are connected in voltage opposition for producing a signal voltage of magnitude and polarity corresponding with the extent and direction of deviation of said constituent from said selected end point, control means including an amplifier having an output circuit and an input circuit responsive to said signal voltage, said control means including a current regulator having separate from the output of said amplifier a current source for said electrolyzing current, said current regulator including a pair of current-adjusting devices selectively operable in response to the output of said amplifier, one of said devices when said signal voltage is of one polarity changing said electrolyzing current to vary said concentration in a direction to return said constituent to said selected end point, and the other of said devices when said signal voltage is of opposite polarity changing said electrolyzing current to vary said concentration in a direction to return said constituent to said selected end point, and circuit means responsive to the output of said amplifier for cycling one or the other of said devices in accordance with the polarity of said signal voltage and at a rate dependent upon the magnitude of said signal voltage for change in said magnitude of said electrolyzing current at a rate proportional to the magnitude of said signal voltage.

7. In a system for continuously determining the concentration of a constituent in a fluid, the combination of a cell for passage of fluid into and out of it, electrodes disposed in said cell in an electrolyte containing said fluid for flow of electrolyzing current between said electrodes electrolytically to vary the concentration of the constituent in said cell, detecting means responsive to the concentration of said constituent in said cell for producing a potential difference, adjustable means in series with said detecting means having a source of voltage for developing in opposition to said potential difference of said detecting means a potential difference corresponding with a selected end point of said constituent in said electrolyte for producing a signal voltage of one polarity or the other depending upon the relative magnitudes of said opposing potential differences, control means including an amplifier having an output circuit and an input circuit responsive to said signal voltage, means operable in accordance with the output from said amplifier for producing between said electrodes a component of said electrolyzing current proportional to the magnitude of said signal voltage, said control means including a current regulator having separate from the output of said amplifier a current source for a component of said electrolyzing current, said current regulator including a pair of current adjusting devices selectively operable in response to the output of said amplifier, one of said devices increasing said electrolyzing current when said signal voltage is of one polarity and the other of said devices decreasing said electrolyzing current when said signal voltage is of opposite polarity, the extent of said change of said electrolyzing current by each of said devices being dependent upon both the magnitude of said signal voltage and the duration of said signal voltage.

References Cited in the file of this patent
UNITED STATES PATENTS

| | | |
|---|---|---|
| 1,834,134 | Paschen | Dec. 1, 1931 |
| 2,345,498 | Perley | Mar. 28, 1944 |
| 2,368,582 | Sziklai | Jan. 30, 1945 |
| 2,374,044 | Smith | Apr. 17, 1945 |
| 2,432,140 | Dehmel | Dec. 9, 1947 |
| 2,488,505 | Wannamaker | Nov. 15, 1949 |
| 2,500,284 | Heyrovsky | Mar. 14, 1950 |
| 2,526,857 | Chaney | Oct. 24, 1950 |
| 2,568,391 | Geiselman | Sept. 18, 1951 |
| 2,621,671 | Eckfeldt | Dec. 16, 1952 |

OTHER REFERENCES

"Analytical Chemistry," vol. 20, No. 11 (Nov. 1948), pages 1008 thru 1014, publication by Shaffer et al.

"Analytical Chemistry," vol. 22 (Mar. 18, 1950), pages 463–468, article by Lamphere et al.; vol. 21 (1949), pages 178–80, article by Penther et al.